United States Patent [19]
Woytaszek

[11] Patent Number: 5,759,130
[45] Date of Patent: Jun. 2, 1998

[54] ROTARY GEAR DRIVE SYSTEM

[75] Inventor: Lloyd Woytaszek, Alpena, Mich.

[73] Assignee: H. Bradford Aarons, Lewiston, Mich.

[21] Appl. No.: 675,241

[22] Filed: Jul. 2, 1996

[51] Int. Cl.$^6$ .................................................. F16H 1/46
[52] U.S. Cl. ................................................... 475/339
[58] Field of Search .................................. 475/331, 339

[56] References Cited

U.S. PATENT DOCUMENTS

| | | |
|---|---|---|
| 328,014 | 10/1885 | Cushman . |
| 1,366,325 | 1/1921 | Perin . |
| 1,815,334 | 7/1931 | Sheridan . |
| 2,033,343 | 3/1936 | Larkin, Jr. . |
| 2,122,330 | 6/1938 | Stenzy . |
| 2,179,405 | 11/1939 | De Falco . |
| 2,795,971 | 6/1957 | Annis . |
| 2,989,596 | 6/1961 | Lee et al. . |
| 3,156,136 | 11/1964 | Sogabe . |
| 3,330,171 | 7/1967 | Nasvytis . |
| 3,543,690 | 12/1970 | Lee ........................................ 475/339 |
| 4,044,633 | 8/1977 | Lee . |
| 4,321,842 | 3/1982 | Stromotich . |

*Primary Examiner*—Dirk Wright
*Attorney, Agent, or Firm*—Reising, Ethington, Learman & McCulloch PLLC

[57] ABSTRACT

A gear-reducing, torque-multiplying gear drive assembly having a housing journaling coaxial input and output shafts coupled by an orbital gear drive assembly. A driving sun gear is fixed on the input shaft and rotates a plurality of input planet gears fixed to associated planet shafts journaled at their opposite ends by end walls of a rotary cage within the housing. Each planetary shaft also has an output planet gear within the cage enmeshed with a stationary sun gear fixed to the housing. Rotating the input shaft rotates the planet gears which in turn rotates the cage and drives the output shaft. Selecting the output planetary gears and stationary sun gear to be twice the size of the input gears produces a 2:1 gear ratio between the input and output shaft with a resultant 1:4 torque ratio.

17 Claims, 2 Drawing Sheets

ROTARY GEAR DRIVE SYSTEM

This invention relates to rotary gear drive systems and particularly those that generate a reduced gear ratio with a corresponding increased torque ratio between the driving and driven members of the system.

BACKGROUND OF THE INVENTION

Various gearing arrangements have been proposed which increase the output torque of the driven component of a system in relation to the input torque by control of the input-to-output gear ratio.

U.S. Pat. Nos. 2,122,330; 3,156,136; and 4,321,842 are examples of rotary gear drive systems wherein an internal rotary frame or cage is provided within a case and carrying various input and output planet gears for driven rotation of the gears and cage by an input sun gear. In each case, the output planet gears are supported to the outside of the rotary cage and are enmeshed with a stationary sun gear. Under heavy loading, such cantilevered support of the output planet gears can place unwanted stress on the planet shafts and/or the bearings they are journaled in and shorten the life of the gear drive system.

SUMMARY OF THE INVENTION AND ADVANTAGES

A rotary gear drive assembly constructed according to the present invention comprises a case journaling an input shaft and housing a rotary cage having axially spaced end walls. A plurality of planet shafts are journaled at their opposite ends by the end walls of the cage and each shaft supports a pair of adjacent input and output planet gears between the end walls. The input shaft has a driving sun gear arranged between the end walls and coupled by a driving connection to the input planet gears. A stationary sun gear is arranged between the end walls and is enmeshed with the output planet gears. Rotation of the input shaft drives the input planet gears and causes the output planet gears and hence the cage to rotate about the axis of the input shaft through engagement with the stationary sun gear. An output member is coupled to the cage and is driven thereby coaxially with the input shaft.

In a preferred embodiment, the gear drive assembly generates a 2 to 1 gear ratio between the driving and driven input and output members, but with a resultant 1 to 4 torque ratio—double that which would normally be expected with conventional fixed shaft gear arrangements.

Also according to the preferred embodiment, the rotary cage includes an intermediate wall arranged between the end walls and interconnected thereto by peripheral interconnecting portions of the cage. The intermediate wall journals one end of a plurality of idler shafts on which idler gears are fixed serving as the driving connection between the driving sun gear and input planet gears. The other end of the idler shafts are journaled by one of the end walls. The intermediate wall further strengthens the rotary cage and provides additional support for the shafts. If desired, the intermediate wall can journal the planet shafts between the input and output planet gears to provide additional support and integrity to the planet shafts and their gears. The added weight of the intermediate wall is a further benefit in that it increases the mass an hence the inertial momentum of the cage so as to increase its effectiveness as a fly wheel during operation, increasing the efficiency of the gear drive assembly.

THE DRAWINGS

These and other features and advantages of the present intention will be more fully and appreciated by those skilled in the art when considered in connection with the following detailed description and accompanying drawings, wherein.

DETAILED DESCRIPTION

Figure 1:
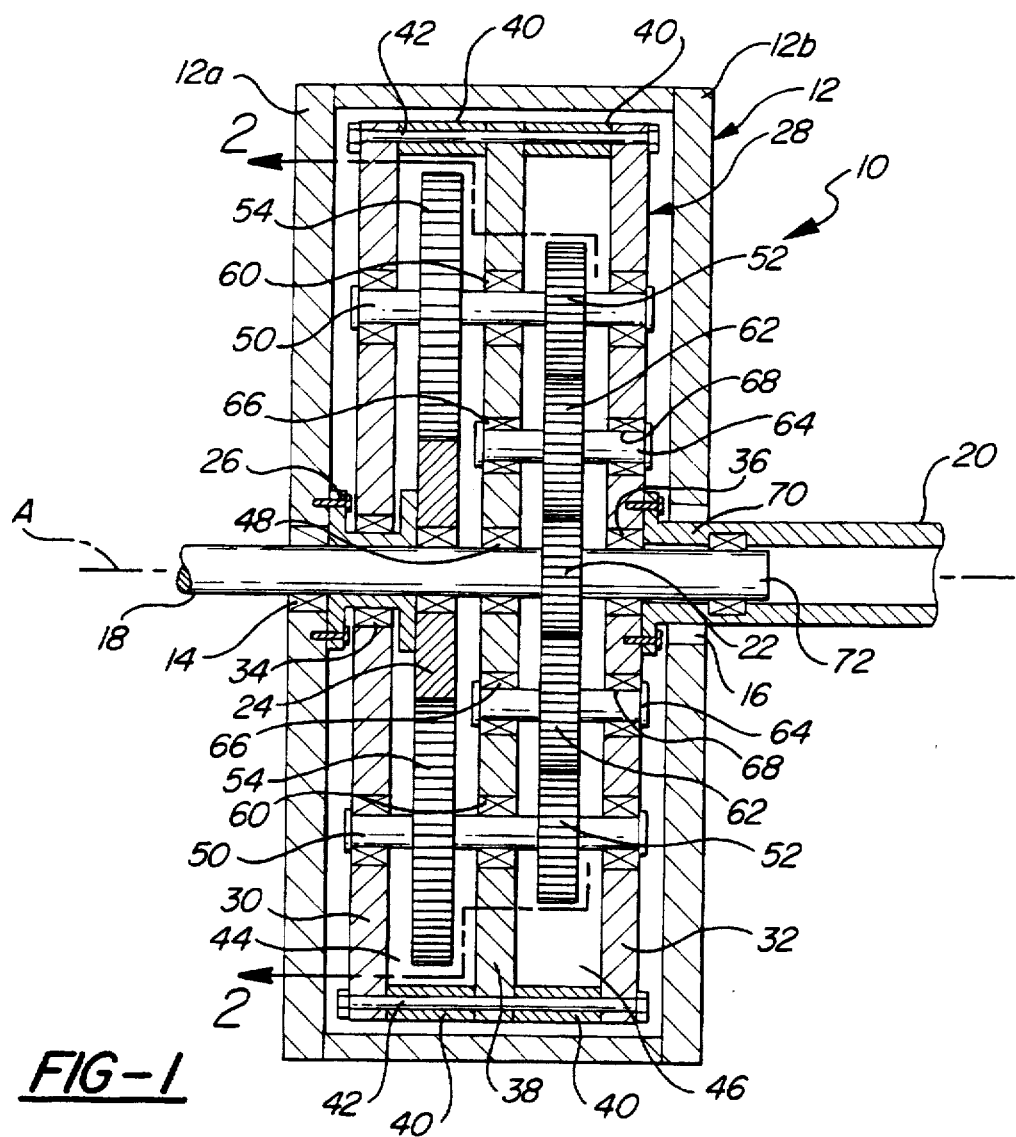
FIG. 1 is a cross-sectional front elevation view of a drive gear assembly according to one embodiment of the invention.
Figure 2:
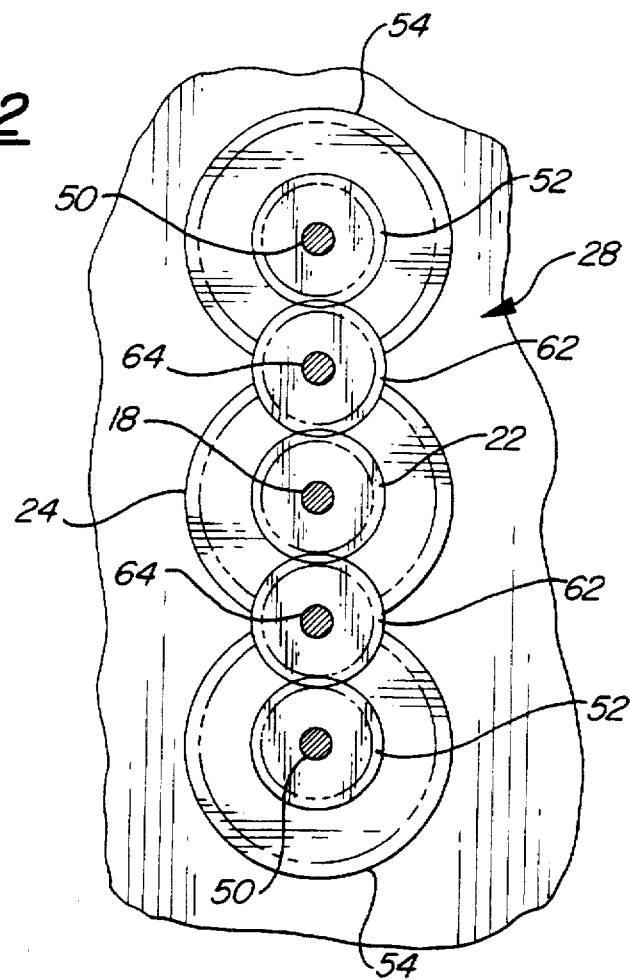
FIG. 2 is a sectional view taken substantially on line 2—2 of FIG. 1.

A gear-reducing torque-multiplying gear drive assembly constructed in accordance with a presently preferred embodiment of the invention is indicated generally at 10 in FIGS. 1 and 2 and comprises a fixed enclosure or housing 12 having opposed end walls 12a, 12b in which suitable journal bearings 14, 16 are provided supporting a driving input member or shaft 18 and a driven output member 20, respectively, for rotation about a common longitudinal axis A relative to the housing 12 and one another.

The input shaft 18 carries a driving sun gear 22 that is fixed to the shaft 18 by a key or other suitable connection (not shown) for driving rotation with the shaft 18 about the axis A. Adjacent the driving sun gear 22 is a second stationary sun gear 24 disposed coaxially about the input shaft 18 and fixed against rotation to the end wall 12a of the housing 12 by bushing 26. The input shaft 18 passes through the bushing 26 and a journal bearing 24a provided in the fixed sun gear 24, enabling the shaft 18 to rotate relative to the fixed sun gear 24 and busing 26.

Supported also within the housing 12 is a rotary frame or cage 28 having a pair of spaced apart, parallel end walls 30, 32 provided with suitable journal bearings 34, 36 to support the cage 28 for rotation relative to the housing 12 and input shaft 18 about the axis A. An intermediate wall 38 of generally the same configuration may be provided between the end walls 30, 32 and supported in generally spaced, parallel relation to each of the end walls 30, 32 by suitable interconnecting structure, such as spacers 40 and tie rods 42 provided at circumferentially spaced locations about the perimeter of the walls 30, 32 and 38, dividing the space within the cage 28 into left and right chambers 44, 46, respectively. A suitable journal bearing 48 may also be provided in the intermediate wall 38 for journal support on the input shaft 18.

As illustrated best in FIG. 1, the fixed and driving sun gears 24, 22 are supported between the end walls 30, 32 of the rotary cage 28 within the left and right chambers 44, 46 of the cage 18, respectively. The cage 28 supports a plurality of planet shafts 50 radially outwardly of the input shaft 18 on each of which a set of input and output planet gears 52, 54 are fixed by a suitable means such as a keys (not shown) to the planet shafts 50 for rotation therewith about their respective axes relative to the rotary cage 28. As shown in FIG. 1, the opposite ends 50a, 50b of the planet shafts 50 are supported by suitable journal bearings 56, 58 provided in the end walls 30, 32 to provide support to the shafts 50 axially outwardly of the planet gears 52, 54. Preferably, another journal bearing 60 is provided to the intermediate wall 38 to provide journaled support to the planet shafts 50 between the input and output planet gears 52, 54 as well.

The assembly 10 has a driving connection in the preferred form of idler gears 62 that serve to transfer power from the driving sun gear 22 to the input planet gears 52. As illustrated in FIG. 1, the idler gears 62 are fixed on idler shafts 64 such as by keys (not shown). The shafts 64 are supported at each end by suitable journal bearings 66, 68 provided in the intermediate wall 38 and end wall 32 radially between the input shaft 18 and the associated planet shafts 50. The idler gears 62 are accommodated within the right chamber 46 of the cage 18 with their teeth enmeshed with the teeth of the driving sun gear 22 and each of the input planet gears 52.

The output planet gears 54 are enmeshed with the fixed sun gear 24 which also is accommodated within the left chamber 44.

The driven output member 20 may comprise a shaft having a hollow end 70 accommodating an end 72 of the input shaft 18 therein and secured by suitable fasteners or the like to the rotary cage 28 for coaxial rotation with the cage 28 about the axis A of the input shaft 18.

In operation, rotating the input shaft 14 rotates the sun gear 22 which in turn rotates the idler gears 62 and input and output planet gears 52, 54. Rotation of the output planet gears 54 causes the cage 18 to rotate about the central axis A of the input shaft 18 as a result of the output planet gears 54 being enmeshed with the fixed sun gear 22. Rotation of the cage 18 rotates the output shaft 20 about the axis A.

It has been found that the above-described gear arrangement is able to generate a 2 to 1 gear ratio between the input and output shaft 18, 20 with a resultant torque ratio of 1 to 4. This occurs when the input sun 22, idler 62, and planet 52 gears are selected to be of the same diameter and the output planet 54 and sun 22 gears are selected to be twice the size as the input gears. A working model of the above-described assembly was constructed having one inch input sun 20, idler 62 and planet 52 gears and two inch output planet 54 and sun 22 gears. A bench test demonstrated that for each two revolutions of the input shaft 18 the output shaft 20 was caused to make one revolution, hence the 2:1 gear ratio. With the same model, four times the torque was required to be applied to the output shaft 20 to balance a given torque load applied to the input shaft 18, hence the 1:4 torque ratio.

Figure 3:
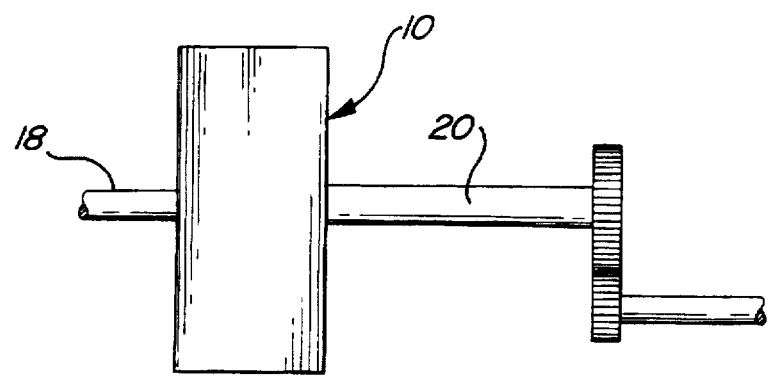
FIG. 3 is a schematic front elevational view showing an alternative output drive.

Those skilled in the art will recognize that various output arrangements may be employed to adjust the gear and torque ratios. FIG. 3, for example, illustrates and arrangement wherein an output gear 76 is fixed to the output shaft 20 and is enmeshed with a reduction gear 78 that is half the diameter as that of the output gear 76 and fixed on an auxiliary output shaft 80. In this arrangement, a 1:1 gear ratio is generated between the input shaft 18 and the auxiliary output shaft 80 but with an accompanying 1:2 torque ratio.

Figure 4:
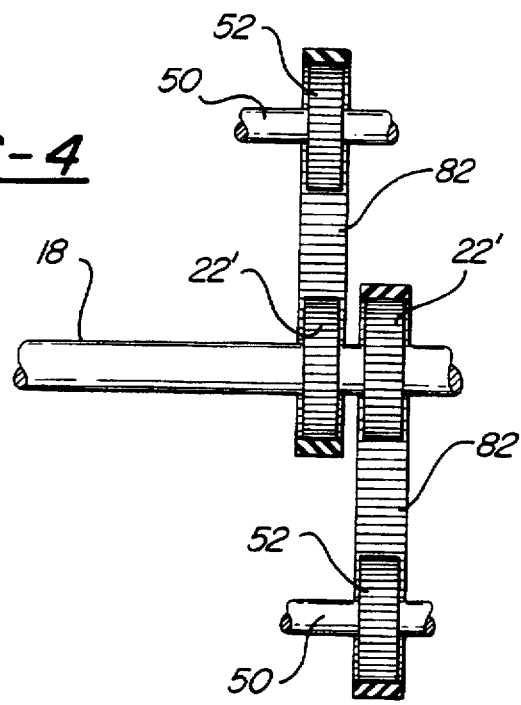
FIG. 4 is a fragmentary elevation sectional view of an alternative input gear drive of the invention.

FIG. 4 illustrates an alternative input gear arrangement in lieu of that described above with reference to FIGS. 1 and 2. In the FIG. 4 embodiment, the driving sun gear 22 of FIG. 1 is replaced with a pair of axially adjacent driving sun gears 22', and the input planet shafts 50 and gears 52 are axially offset in line with their respective sun gears 22' and the idler shafts 64 and gears 62 are replaced by an endless flexible belts or chain drive couplings 82 that are entrained about the sun gears 22' and their respective input planet gears 52. The option is the same as that described previously with the same results being achieved.

It is to be understood that the disclosed embodiments are representative of presently preferred forms of the invention and are intended to be illustrative rather than definitive thereof. The invention is defined in the claims which contemplate various modifications within the scope and spirit of the invention.

I claim:
1. A rotary gear drive assembly comprising:
   a case;
   a driving input shaft journaled by said case for rotation about a longitudinal axis of said input shaft;
   a rotary cage disposed within said case having a pair of opposed axially spaced end walls journaled about said input shaft;
   at least one driving sun gear fixed on said input shaft between said end walls of said cage;
   a plurality of planet shafts journaled by said end walls of said cage;
   a plurality of input planet gears fixed on said planet shafts between said end walls and spaced from said driving sun gear;
   a plurality of output planet gears fixed on said planet shafts between said end walls axially adjacent said input planet gears;
   a driving connection spanning the space between and coupling said driving sun gear to said input planet gears to effect conjoint driven rotation of said input and output planet gears in response to rotation of said driving sun gear;
   a stationary sun gear disposed about said input shaft between said end walls in meshing engagement with said output planet gears to effect rotation of said cage in response to rotation of said output planet gears; and
   a rotary output member fixed to said cage for rotation therewith.

2. The assembly of claim 1 wherein said cage includes an intermediate wall arranged between said end walls of said cage and between said laterally adjacent sets of input and output planet gears.

3. The assembly of claim 2 wherein said driving connection comprises a plurality of idler shafts journaled by said intermediate wall and one of said end walls of said cage, and a plurality of idler gears fixed on said idler shafts and enmeshed with said input sun gear and said input planet gears.

4. The assembly of claim 3 wherein said intermediate wall journals said planet shafts between said input and said output sets of planet gears.

5. The assembly of claim 4 wherein said cage includes an interconnecting portion extending laterally between and interconnecting said intermediate wall and each of said end walls radially outwardly of said input and said output sets of planet gears.

6. The assembly of claim 3 wherein said driving sun gear, said idler gears and said input planet gears are of the same first diameter.

7. The assembly of claim 6 wherein said output planet gears and said fixed sun gear are of the same second diameter.

8. The assembly of claim 7 wherein said first diameter and said second diameter are of a 1:2 ratio.

9. The assembly of claim 1 wherein said input shaft and said rotary output member have a 2:1 gear ratio.

10. The assembly of claim 9 wherein said input shaft and said rotary output member have a 1:4 torque ratio.

11. The assembly of claim 10 including intermediate idler gears coupling said driving sun gear to said input planet gears, and wherein said driving sun gear, said input planet gears and said idler gears are all of the same first diameter, and said output planet gears and said fixed sun gear are all of the same second diameter, said second diameter being twice that of said first diameter.

12. The assembly of claim 10 wherein said output member includes an output gear fixed thereon coupled to a reduction gear of an auxilliary output member, said reduction gear being half the size as that of said output hear to generate of 1:1 gear ratio between the input shaft and the auxilliary output member with an accompanying 1:2 torque ratio.

13. The assembly of claim 1 wherein said rotary output member comprises an output shaft secured at one end to said cage and journaled by said case for rotation with said cage coaxially about said input shaft, said secured end of said output shaft being hollow, said input shaft extending into and journaled by said secured end of said output shaft.

14. The assembly of claim 2 wherein said driving connection comprises an endless belt or chain entrained about said at least one said driving sun gear and respective ones of said input planet gears.

15. A gear reducing, torque increasing gear drive assembly, comprising:

a case;

a rotary cage disposed within said case having a pair of end walls, an intermediate wall, and peripheral connecting portions interconnecting said intermediate and said end walls in laterally spaced parallel relation to one another;

a gear train including an input shaft journaled by said case and journaling said end walls of said cage, at least one driving sun gear fixed to said input shaft between said intermediate wall and one of said end walls of said cage, a plurality of planet shafts journaled by said end walls of said cage in parallel radially outwardly spaced relation to said input shaft, a plurality of input planet gears fixed to said planet shafts between said intermediate wall and said one end wall of said cage, a plurality of output planet gears fixed to said planet shafts axially adjacent said input planet shafts between said intermediate wall and the other of said end walls of said cage, a plurality of idler shafts journaled by said intermediate wall and said one end wall radially between said input shaft and said planet shafts, a plurality of idler gears fixed to said idler shafts between said intermediate wall and said one end wall of said cage and enmeshed with said driving sun gear and said input planet gears, a fixed sun gear arranged about said input shaft between said intermediate wall and said other wall of said cage and enmeshed with said output planet gears, and a rotary output coaxial with said input shaft and fixed to said cage for rotation about an axis of said input shaft, and wherein said gears are sized in relation to one another to generate a 2:1 gear ratio and a 1:4 torque ratio between said input shaft and said rotary output.

16. A rotary gear drive assembly comprising:

a case;

a driving input shaft journaled by said case for rotation about a longitudinal axis of said input shaft;

a rotary cage disposed within said case having a pair of opposed axially spaced end walls journaled about input shaft;

at least one driving sun gear fixed on said input shaft between said end walls of said cage;

a plurality of planet shafts journaled by said end walls of said cage;

a plurality of input planet gears fixed on said planet shafts between said end walls;

a plurality of output planet gears fixed on said planet shafts between said end walls axially adjacent said input planet gears;

a driving connection coupling said driving sun gear to said input planet gears to effect conjoint driven rotation of said input and output planet gears in response to rotation of said driving sun gear, said driving connection comprising a plurality of idler shafts journaled by said intermediate wall and one of said end walls of said cage, and a plurality of idler gears fixed on said idler shafts and enmeshed with said input sun gear and said input planet gears;

a stationary sun gear disposed about said input shaft between said end walls in meshing engagement with said output planet gears to effect rotation of said cage in response to rotation of said output planet gears; and a rotary output member fixed to said cage for rotation therewith.

17. A rotary gear drive assembly comprising:

a case;

a driving input shaft journaled by said case for rotation about a longitudinal axis of said input shaft;

a rotary cage disposed within said case having a pair of opposed axially spaced end walls journaled about input shaft;

at least one driving sun gear fixed on said input shaft between said end walls of said cage;

a plurality of planet shafts journaled by said end walls of said cage;

a plurality of input planet gears fixed on said planet shafts between said end walls;

a plurality of output planet gears fixed on said planet shafts between said end walls axially adjacent said input planet gears;

a driving connection coupling said driving sun gear to said input planet gears to effect conjoint driven rotation of said input and output planet gears in response to rotation of said driving sun gear, said driving connection comprising an endless belt or chain entrained about said at least one said driving sun gear and respective ones of said input planet gears;

a stationary sun gear disposed about said input shaft between said end walls in meshing engagement with said output planet gears to effect rotation of said cage in response to rotation of said output planet gears; and a rotary output member fixed to said cage for rotation therewith.

* * * * *